United States Patent
Chen et al.

(10) Patent No.: US 10,133,823 B2
(45) Date of Patent: *Nov. 20, 2018

(54) AUTOMATICALLY PROVIDING RELEVANT SEARCH RESULTS BASED ON USER BEHAVIOR

(71) Applicant: International Business Machines Corporation, Armonk, NY (US)

(72) Inventors: Li Chen, Cary, NC (US); Henri Fouotsop Meli, Cary, NC (US); David Michael Stecher, Durham, NC (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/219,405

(22) Filed: Mar. 19, 2014

(65) Prior Publication Data
US 2014/0201198 A1    Jul. 17, 2014

Related U.S. Application Data

(63) Continuation of application No. 13/687,529, filed on Nov. 28, 2012.

(51) Int. Cl.
*G06F 17/30* (2006.01)

(52) U.S. Cl.
CPC .. *G06F 17/30867* (2013.01); *G06F 17/30648* (2013.01); *G06F 17/30991* (2013.01)

(58) Field of Classification Search
CPC ......... G06F 17/30867; G06F 17/30864; G06F 17/3053; G06F 17/30699; G06F 17/30554;
(Continued)

(56) References Cited

U.S. PATENT DOCUMENTS 6,643,640 B1   11/2003   Getchius et al.
7,539,673 B2 *  5/2009   Trowbridge ........ G06F 11/3438
(Continued)

FOREIGN PATENT DOCUMENTS

CN    101030206 A    9/2007
CN    101030210 A    9/2007
(Continued)

OTHER PUBLICATIONS

Luo, G.; "Design and evaluation of the iMed intelligent medical search engine"; 2009 IEEE 25th International Conference on Data Engineering; ICDE 2009; pp. 1379-1390; IEEE; 2009.
(Continued)

*Primary Examiner* — Scott A. Waldron
*Assistant Examiner* — Andalib F Lodhi
(74) *Attorney, Agent, or Firm* — Joseph Polimeni; Edell, Shapiro & Finnan, LLC

(57) ABSTRACT

According to an embodiment of the present invention, a system displays initial search results based on a query and enables selection by a user of an item within the search results. The system determines refined search results based on behavior of the user with respect to the initial search results. Embodiments of the present invention further include a method and computer program product for presenting revised search results based on user behavior while examining the results in substantially the same manners described above.

14 Claims, 5 Drawing Sheets

(58) Field of Classification Search
CPC ......... G06F 17/30663; G06F 17/30861; G06F 17/3097; G06F 17/30991; G06F 17/30696; G06F 17/30648; G06Q 30/02
USPC ........................................ 707/722, 736, 749
See application file for complete search history.

(56) References Cited

U.S. PATENT DOCUMENTS

| | | | |
|---|---|---|---|
| 7,792,821 B2* | 9/2010 | Shakib et al. | 707/714 |
| 7,801,885 B1 | 9/2010 | Verma | |
| 7,885,981 B2* | 2/2011 | Kaufman et al. | 707/802 |
| 7,890,528 B1 | 2/2011 | Khoshnevisan | |
| 8,095,582 B2* | 1/2012 | Cramer | G06F 17/30867 707/705 |
| 8,589,429 B1* | 11/2013 | Thirumalai | G06F 17/3064 707/729 |
| 8,620,915 B1* | 12/2013 | Brukman | G06F 17/30867 707/733 |
| 8,868,548 B2* | 10/2014 | Kurzion | 707/723 |
| 9,002,174 B2* | 4/2015 | Marantz et al. | 386/241 |
| 9,098,569 B1 | 8/2015 | Bhagat | |
| 2004/0199541 A1 | 10/2004 | Goldberg et al. | |
| 2006/0069670 A1* | 3/2006 | Khaliq et al. | 707/3 |
| 2006/0074883 A1* | 4/2006 | Teevan et al. | 707/3 |
| 2006/0282416 A1* | 12/2006 | Gross | G06F 17/30864 |
| 2007/0208730 A1* | 9/2007 | Agichtein et al. | 707/5 |
| 2007/0233692 A1* | 10/2007 | Lisa | G06F 17/30651 |
| 2008/0147632 A1 | 6/2008 | Couch et al. | |
| 2009/0012949 A1* | 1/2009 | Thompson et al. | 707/4 |
| 2009/0112910 A1 | 4/2009 | Picault et al. | |
| 2009/0119254 A1* | 5/2009 | Cross | G06F 17/30867 |
| 2009/0171813 A1* | 7/2009 | Byrne | G06F 17/30867 705/26.1 |
| 2009/0240685 A1* | 9/2009 | Costello | G06Q 30/02 |
| 2009/0249248 A1 | 10/2009 | Burckart et al. | |
| 2011/0022590 A1* | 1/2011 | Yu | 707/728 |
| 2011/0119250 A1* | 5/2011 | Lacasse | G06F 17/30867 707/717 |
| 2012/0095984 A1 | 4/2012 | Wren-Hilton et al. | |
| 2012/0130858 A1 | 5/2012 | Kiss et al. | |
| 2012/0209840 A1 | 8/2012 | Gur | |
| 2013/0159340 A1* | 6/2013 | Blanco | G06F 17/30867 707/769 |
| 2014/0143224 A1* | 5/2014 | Allawi et al. | 707/706 |
| 2014/0149690 A1 | 5/2014 | Chen et al. | |
| 2015/0161261 A1* | 6/2015 | Griddaluru | 707/769 |

FOREIGN PATENT DOCUMENTS

| | | |
|---|---|---|
| CN | 101351798 A | 1/2009 |
| CN | 101625682 A | 1/2010 |
| CN | 102609539 A | 7/2012 |

OTHER PUBLICATIONS

Garg, AK.; "Method and System for Enabling a User to Select Search Results and Aggregate Selected Search Results"; http://priorartdatabase.com/IPCOM/000210141; 3 pages, Aug. 26, 2011.
IBM; "ETBI: System to Incrementally Refine Website Search Based on User Interaction"; http://www.ip.com/pubview/IPCOM000154542D; 4 pages, Jul. 5, 2007.
IBM; "Method for refining search terms and rapid reordering of search results"; http://www.ip.com/pubview/IPCOM000170243D; 2 pages, May 13, 2008.
IBM; "System and method to refine search terms for repetitive search queries based on explicit user feedback"; http://www.ip.com/pubview/IPCOM000160889D; 3 pages, Dec. 3, 2007.
McGee, Matt; "Yahoo News Testing Related Search Results on News Stories"; http://searchengineland.com/yahoo-news-testing-related-search-results-48372; 2 pages, Aug. 9, 2010.
Mukherjee, Rajat; "Fresher related search suggestions"; http://googleblog.blogspot.com/2008/06/fresher-related-search-suggestions.html; 2 pages, Jun. 12, 2008.
Chinese Office Action dated Jul. 20, 2016, 6 pages.

* cited by examiner multiple display related search results

Coordinated Related-Search Feedback That Assists Search Refinement
US Pat. App 11420191 - Filed May 24, 2006
In particular, it relates to conducting a plurality of related searches and making the results simultaneously available to the user in a coordinated display ...
Overview - Abstract - Drawing - Descriptions - Claims Method and apparatus for identifying related searches in a ...
US Pat. App 11092182 - Filed Mar 29, 2005
The search results and related search results may be displayed in any convenient ... Searching for multiple matches per index entry is generally faster when ...
Overview - Abstract - Drawing - Descriptions - Claims Systems and Methods For Providing Keyword Related Search Results ...
US Pat. App 12835602 - Filed Jul 13, 2010
The multi-layered dialog box also displays multiple selectable (e.g., ... enabling viewers to conduct web searches and/or review search results without ...
Overview - Abstract - Drawing - Descriptions - Claims Performing multiple related searches
US Pat. App 7991780 - Filed May 7, 2008 - Issued Aug 2, 2008
GUI 126 can display one or more text boxes for entering a search query and/or search results from a search related to a previously entered search query. ...
Overview - Abstract - Drawing - Descriptions - Claims Systems and methods for sorting and displaying search results in ...
US Pat. App 7660822 - Filed Mar 31, 2004 - Issued Feb 9, 2010
Using the results of the search and sort, server 120 may then provide a multi-dimensional display document 140 to client 110. Multi-dimensional display ...
Overview - Abstract - Drawing - Descriptions - Claims

FIG.4

Systems and methods for sorting and displaying search results in ...

US Pat. App 7660822 - Filed Mar 31, 2004 - Issued Feb 9, 2010
Using the results of the search and sort, server 120 may then provide a multi-dimensional display document 140 to client 110. Multi-dimensional display ...
Overview - Abstract - Drawing - Descriptions - Claims

Displaying User Feedback for Search Results From People Related to ...

US Pat. App 11382572 - Filed May 10, 2006
The search engine interface 700A includes a heading 705 under which search results corresponding to content that is available are displayed ...
Overview - Abstract - Drawing - Descriptions - Claims

SEARCH RESULTS DISPLAY FOR WEIGHTED MULTI-TERM SEARCHES

US Pat. App 12347537 - Filed Dec 31, 2008
1A and 1B, taken together, are a pictorial illustration of a search engine user interface configured for displaying search results for weighted, multi-term ...
Overview - Abstract - Drawing - Descriptions - Claims

FIG.5

AUTOMATICALLY PROVIDING RELEVANT SEARCH RESULTS BASED ON USER BEHAVIOR

This application is a continuation of U.S. patent application Ser. No. 13/687,529, entitled "AUTOMATICALLY PROVIDING RELEVANT SEARCH RESULTS BASED ON USER BEHAVIOR" and filed Nov. 28, 2012, the disclosure of which is incorporated herein by reference in its entirety.

BACKGROUND

1. Technical Field

Present invention embodiments relate to viewing search results and, in particular, to automatically determining and presenting the most relevant search results based on user behavior.

2. Discussion of Related Art

Internet searching plays a ubiquitous and important role in business and daily life. People have come to rely on internet searches to obtain information on all sorts of topics. Some searches (e.g., searches related to the syntax of a programming language or aspects of an application programming interface specification) are directed toward discovering specific pieces of information that can be found quickly and easily by viewing the titles of the search results or the context information displayed along with corresponding links. However, other searches (e.g., prior art searches in the context of patents) may return a large set of results. Since one normally opens the top results one by one and skims through each document to find relevant content, or one selects a document to open based on the titles and context information among the top results, the large set of results can be tedious and time consuming to sift through.

BRIEF SUMMARY

According to an embodiment of the present invention, a system displays initial search results based on a query and enables selection by a user of an item within the search results. The system determines refined search results based on behavior of the user with respect to the initial search results. Embodiments of the present invention further include a method and computer program product for presenting revised search results based on behavior while examining the results in substantially the same manners described above.

BRIEF DESCRIPTION OF THE SEVERAL VIEWS OF THE DRAWINGS

Generally, like reference numerals in the various figures designate like components.

FIG. 4 is an illustration of example search results containing a plurality of references to content.

FIG. 5 is an illustration of example revised search results based on a user action according to an embodiment of the present invention.

DETAILED DESCRIPTION

Present invention embodiments pertain to assisting a user in viewing a (possibly large) set of search results. In response to the user's actions while inspecting the results, the user is automatically presented with a few results that are determined to be the most relevant. The user's behavior provides information that can help determine the results of greatest interest to the user. For example, if the user selects or highlights certain text (e.g., text within the search results display or within a document selected from the search results), words within the selected text can be used to supplement the original query and refine the search results. Likewise, entire documents opened by the user and/or portions of documents the user spent the most time viewing can be analyzed to determine the most relevant results.

Figure 1:
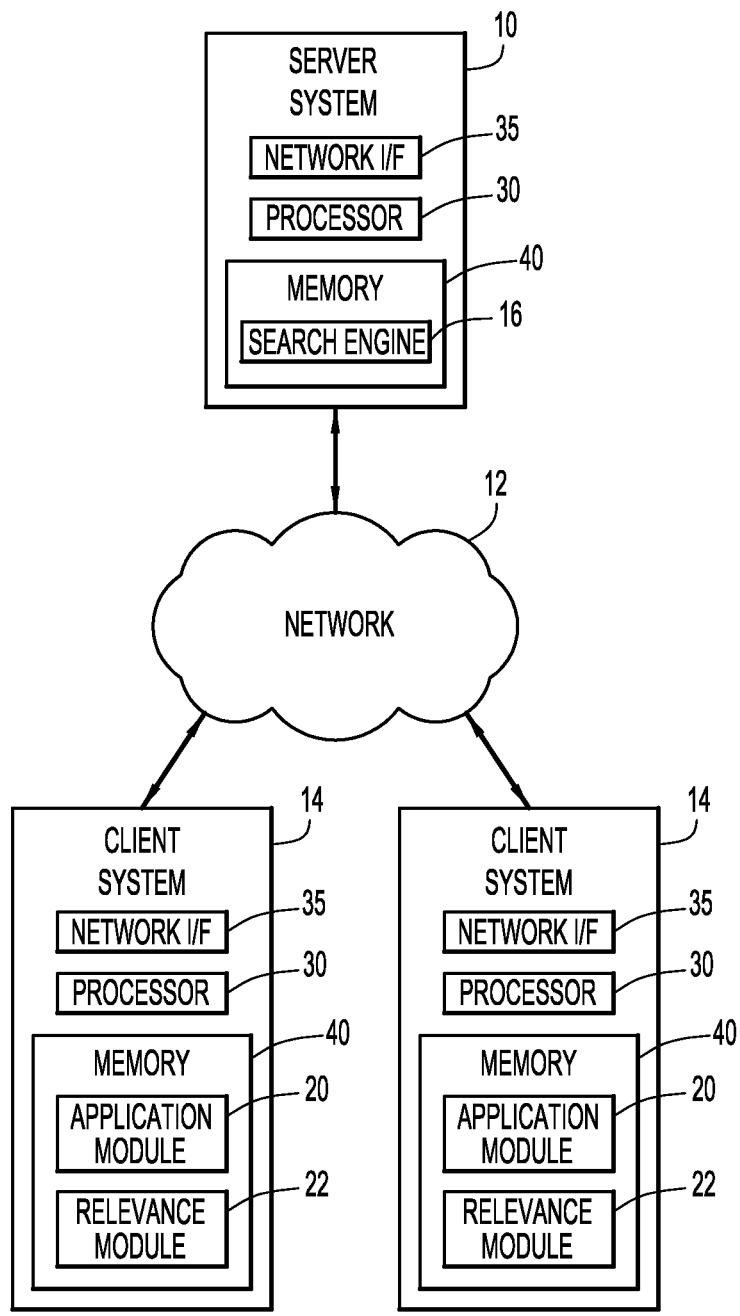
FIG. 1 is a diagrammatic illustration of a computing environment for an embodiment of the present invention.

An example computing environment for use with a present invention embodiment is illustrated in FIG. 1. Specifically, the environment includes one or more server systems 10 and one or more client or end-user systems 14. Server systems 10 and client systems 14 may be remote from each other and communicate over a network 12.

Network 12 may be implemented by any number of any suitable communications media (e.g., wide area network (WAN), local area network (LAN), Internet, Intranet, etc.), Alternatively, server systems 10 and client systems 14 may be local to each other, and communicate via any appropriate local communication medium (e.g., local area network (LAN), hardwire, wireless link, Intranet, etc.).

A server system may include a search engine 16, The search engine may be implemented by any conventional or other search engine, and may be distributed across plural server systems. Alternatively, the search engine may reside on a client system 14 or other computer system in communication with the client system.

Client systems 14 enable users to submit search or other queries to search engine 16 and receive search results. The client systems include an application module 20 (e.g., a web browser, file system browser, help system, merchandise catalog, database client, encyclopedia, dictionary, etc.) that may present any graphical user (e.g., GUI, etc.) or other interface (e.g., command line prompts, menu screens, etc.) to solicit queries from users and display results. A relevance module 22 automatically presents revised results based on the user's interest as reflected in the user's behavior while examining the results. The relevance module can be integrated into the application module or be separate and have any degree of coupling with the application module (e.g., the relevance module can be built-in, any type of "add-on" (e.g., a plug-in, extension, theme, etc.), filter (e.g., operating on the output only of the application module), etc.), Server systems 10 and client systems 14 may be implemented by any conventional or other computer systems preferably equipped with a display or monitor, a base (e.g., including at least one processor 30, memories 40 and/or internal or external network interface or communications devices 35 (e.g., modem, network cards, etc.)), optional input devices (e.g., a keyboard, mouse, or other input device), and any commercially available and custom software (e.g., application module software, relevance module software, communications software, server software, search engine software, web crawling software, etc.). The computer systems may include server, desktop, laptop, and hand-held devices. In addition, search engine 16, application module 20, and relevance module 22 each may include one or more modules or units to perform. the various functions of present invention embodiments described below (e.g., retrieving user actions, determining most relevant search results, displaying results, etc.), may be implemented by any combination of any quantity of software and/or hardware modules or units, and may reside within memory 40 of the server and/or client systems for execution by processor 30.

Figure 2:
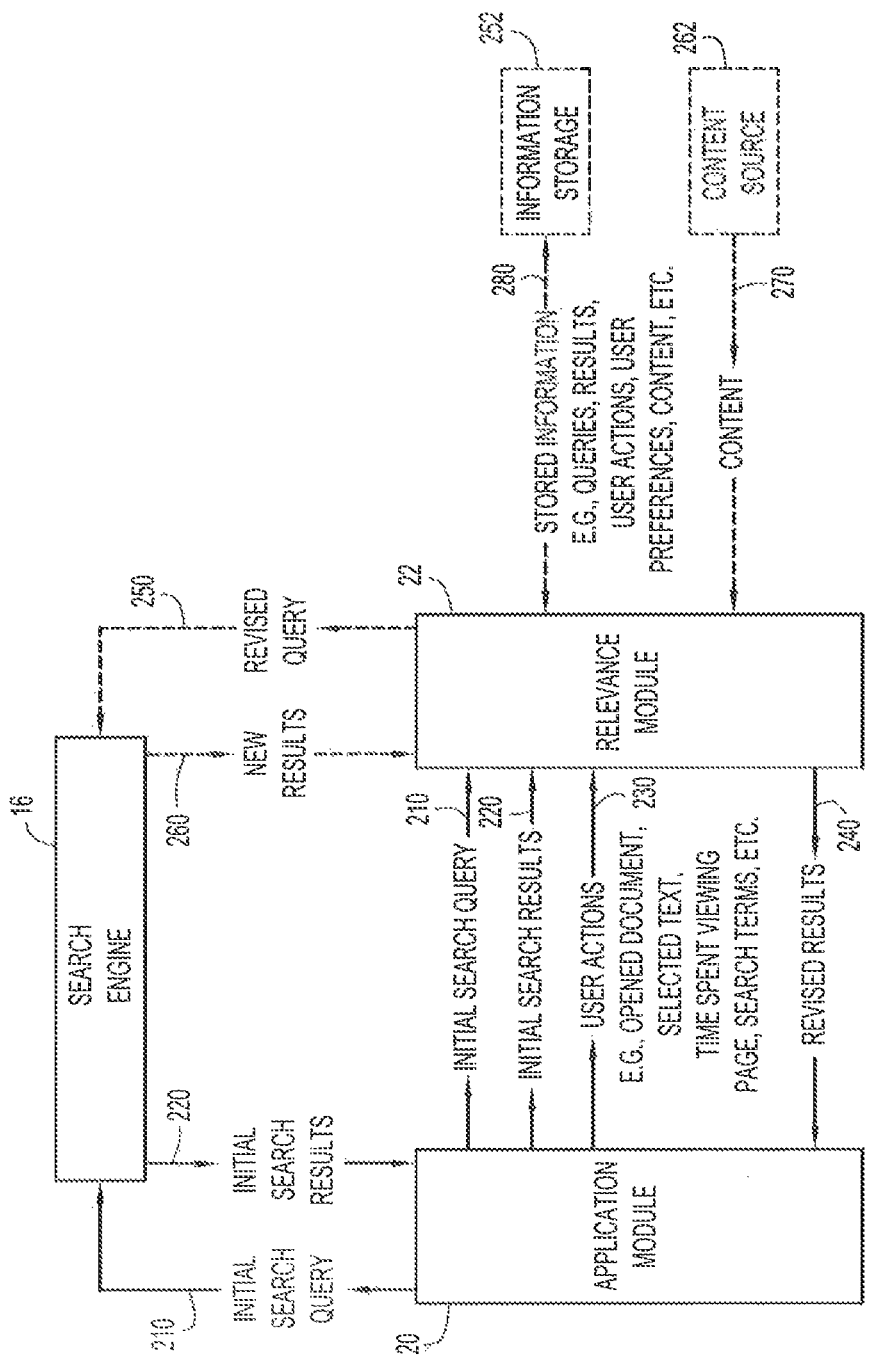
FIG. 2 is a data flow diagram of a search results revision according to an embodiment of the present invention.

A data flow diagram of search results revision (e.g., via server system 10 and/or client system 14) according to an embodiment of the present invention is illustrated in FIG. 2. In particular, an initial search query 210 is submitted from application module 20 to search engine 16. The search engine returns initial search results 220. Relevance module 22 receives (e.g., via application module 20) initial search results 220, initial query 210, and user actions 230 in response to the search results. The relevance module returns revised search results 240 based on a determination of the most relevant results in light of the user action(s).

User actions 230 may include following hyperlinks, opening documents, highlighting/selecting items of information, searching for keywords, viewing a document or portion of a document for a period of time, etc. Actions responsive to the search results include drill-down operations (e.g., following a hyperlink from the search results to a first document and following a hyperlink from the first document to a document not included in the original search results). The relevance module automatically receives the user actions and associated information such as an opened document's name, content, section titles, and metadata; user selected text, time spent viewing a portion of a document; keywords for which a user searched; etc.

Figure 3:
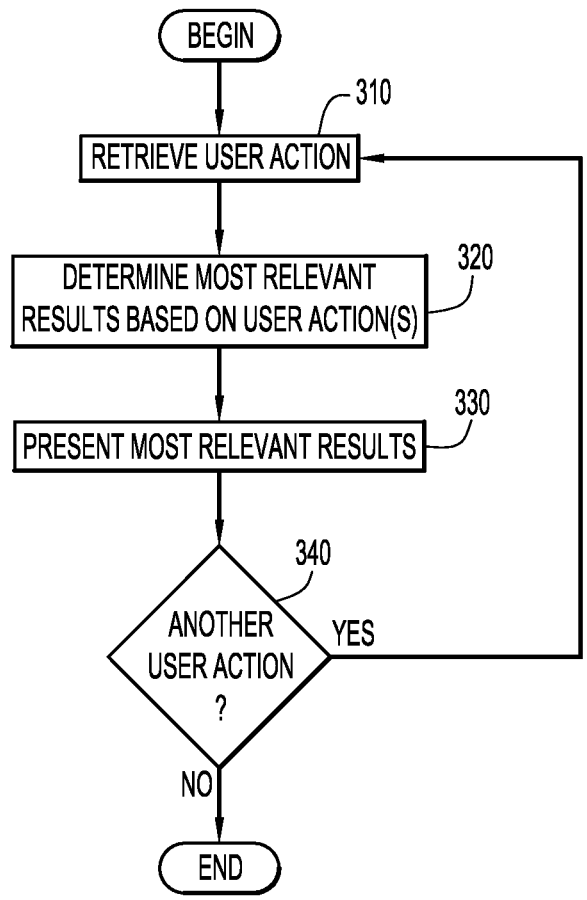
FIG. 3 is a procedural flow chart illustrating an example manner in which search results are revised according to an embodiment of the present invention.

Optionally, the relevance module may receive the initial query and may submit the initial query and/or a revised query 250 to a search engine (e.g., search engine 16) and retrieve new results 260 (e.g., initial search results 220 or revised results 240). In addition, the relevance module may retrieve content 270 referred to in the search results from content source 262 (e.g., a database, web page, etc.). The relevance module may retain stored information 280 (e.g., queries, results, user actions, user preferences, content, etc.) in information storage 252 (e.g., memory 40, a file, a database, etc.); and retrieve stored information for various purposes (e.g., for use in determining the most relevant search results, complying with user preferences, etc.), A manner in which search results are revised (e.g., via server system 10 and/or client system 14) according to an embodiment of the present invention is illustrated in FIG. 3. Initially, relevance module 22 receives a user action at step 310 in response to display of search results (e.g., from search engine 16). At step 320, the most relevant search results are determined based on the user action. Determination of the most relevant results may be based on the current action and any prior actions with respect to the search, To determine the most relevant results, the user actions may be automatically data-mined for information indicative of the user's interest.

The user actions may directly indicate specific keywords that can be used to determine the most relevant search results. For example, keywords can be any words selected/highlighted by the user, listed in a document's metadata, appearing in a document title or section heading, searched for by the user within a document, etc. Data mining methods may be used to determine keywords from user actions and associated information (e.g., by finding words common to more than one document opened by the user). Keywords may be weighted by frequency of occurrence, and common words may be removed or de-weighted.

Given one or more keywords, the top few of the original search results that match the keywords may define the most relevant results. (The content of documents referred to in the search results may be retrieved (e.g., via network 12) in order to determine matches.) Alternatively, the original set of search results may be re-ordered by comparing the relevance of results based on a revised query formed by supplementing the original query with the given keywords, According to another alternative, the relevance module submits a revised query to a search engine to obtain revised results. In this scenario, the top revised results define the most relevant results.

In addition, any methods of automatically analyzing user actions and determining the most relevant search results may be used, with or without explicit isolation of particular keywords based on user actions, For example, the relevance module may employ language processing, semantic analysis, frequency analysis, statistical models, data mining, text similarity metrics, automated reasoning, machine learning, reliability and fuzzy matching, etc.

If the relevance module determines that the user has expressed a new interest while viewing results of a prior search, earlier actions with respect to the search results may be discounted, and the search results may be refreshed to reflect the new interest. For example, if a user searches for a particular automobile manufacturer and selects a link naming a specific model, the relevance module may narrow the search results to those results pertaining to the model. if the user subsequently selects a second model while viewing the results, the relevance module may revise the results to reflect a changed interest.

The most relevant results are returned (e.g., presented to the user via application module 20) at step 330. The system may allow the user to configure the presentation of the results. For example, the user may configure the number of relevant results to display (e.g., 3, 4, 5, 10, etc.) and can choose the layout of the results (e.g., the results may be displayed in a new or current window, tab, frame, set of frames, etc.; beside the current content, below the current content, with the original search results, etc., as a list, as icons, etc.). Likewise, the system may display results automatically in response to user actions or in response to a user command. Optionally, content referred to in the most relevant results is opened for presentation to the user.

If the user takes another action in examining the search results at step 340 (e.g., opens another document in the search results, highlights a new section of text, etc.), the relevance module receives the action and the process repeats. The process ends if the user closes application module 20, initiates a new search, or otherwise concludes the process.

An example of a large set of initial search results and a corresponding set of a few most relevant results presented according to an embodiment of the present invention are provided in FIGS. 4 and 5 respectively. By way of example, a user submits a query for a patent search with the keywords "multiple display related search results." In this example, the user receives a list of 100 results. The top results of the initial search are illustrated in FIG. 4. The user highlights/selects "display search results" while viewing one of the documents from among the top search results. As a result, the three most relevant search results from the original set of search results are automatically displayed together within multiple frames, as illustrated in FIG. 5.

In addition to (or in lieu of) displaying the most relevant results separately from the original search results, the system may also refine the display of the original search results based on the user's interest. For example, the display of the original search results may be re-ordered in accordance with the relevance determination.

It will be appreciated that the embodiments described above and illustrated in the drawings represent only a few of the many ways of implementing embodiments for automatically providing relevant search results based on user behavior.

The relevance module may use any manner of analyzing user actions (e.g., keyword identification, data mining, language processing, semantic analysis, automated reasoning, machine learning, frequency analysis, etc.). The relevance module may use any manner of determining most relevant search results (e.g., synthesizing revised queries, keyword matching, frequency analysis, external search engines, language rule sets, language processing, semantic analysis, information retrieval, automated reasoning, machine learning, reliability and fuzzy matching, etc.). Further, the relevance module may use any combination of information resources (e.g., memory, files, web sites, data caches, databases, search engines, etc.) containing any structured or unstructured data (e.g., search queries, search results, user actions, user preferences, indexes, web pages, metadata, language rules, dictionaries, thesauri, encyclopedias, articles, literary works, etc.).

The relevance module may use any manner of presenting relevant search results (e.g., in a new window, a new tab, a new frame, the same frame, etc.; beside the current content, below the current content, etc.; as a list, as icons, etc.). Further, the relevance module may use any manner of distinguishing the most relevant results from within the search results (e.g., highlighting, setting font characteristics (e.g., type, size, or effects such as bold, italic, or underline), flashing, setting foreground or background color, changing location, any combinations thereof, etc.).

The relevance module may be incorporated into the application module, where its functionality is integrated with that of the application module. For example, the relevance module may formulate the search results directly based on input from the search engine, thereby absorbing the functionality of the relevance module into the application module for generating results.

The topology or environment of the present invention embodiments may include any number of computer or other processing systems (e.g., client or end-user systems, server systems, etc.) and search engines, databases, or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., IBM-compatible, laptop, PDA, mobile devices, etc.), and may include any commercially available operating system and any commercially available or custom software (e.g., application module software, relevance module software, communications software, server software, search engine software, etc.), These systems may include any types of monitors and input devices (e.g., keyboard, mouse, voice recognition, touch screen, etc.) to enter and/or view information.

It is to be understood that the software (e.g., relevance module, application module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices including third party client/server processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., relevance module, application module, etc) may be available on a computer useable or recordable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link. Intranet, etc.).

The system may employ any number of any conventional or other search engines, databases, data stores or storage structures (e.g., files, databases, data structures, data or other repositories, etc.) to store information (e.g., search queries, search results, user actions, web pages, caches, indexes, metadata, language rules, dictionaries, thesauri, encyclopedias, articles, literary works, etc.). The database system may be implemented by any number of any conventional or other databases, data stores or storage structures (e.g., files, databases, data structures, data or other repositories, etc.) to store information (e.g., search queries, search results, user actions, user actions, web pages, caches, indexes, metadata, language rules, dictionaries, thesauri, encyclopedias, articles, literary works, etc.). The relevance module, application module, and/or search engine may be included within or coupled to the server and/or client systems. The relevance module, application module, search engine, and/or data storage structures may be remote from or local to the computer or other processing systems, and may store any desired data (e.g., search queries, search results, user actions, web pages, rules, data to be analyzed, etc.).

Present invention embodiments may be utilized for providing relevant results of any type (e.g., alpha numeric text, symbols, markup language, previews, images, waveforms, binary data, etc.) representing results from any type of search of any source (e.g., web, interact, intranet, file system, memory devices, data structure, help system, library, merchandise catalog, database client, encyclopedia, dictionary, etc.).

The initial and most relevant search results may be of any size, displayed as any number of pages, and include any type of data (e.g., boolean, character, alphanumeric, numeric, symbols, etc.) representing any information, The present invention embodiments may employ any number of any type of user interface (e.g., Graphical User Interface (GUI), command-line, prompt, etc.) for obtaining or providing information (e.g., obtaining information for the desired query, etc.), where the interface may include any information arranged in any fashion, The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc). The interface screens may include any suitable actuators (e.g., links, tabs, etc.) to navigate between the screens in any fashion.

The present invention embodiments are not limited to the specific tasks, algorithms, or network/environment described above, but may be utilized for analyzing any indicia of interest to determine and present relevant information.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system," Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (Java and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts, or combinations of special purpose hardware and computer instructions.

The various modules (e.g., relevance module, application module, search engine, etc.) may be implemented by any combination of any quantity of software and/or hardware modules or units, and may reside within memory 40 of the server and client systems for execution by processor 30. Further, present invention embodiments may be utilized for any types of inquiries (e.g., factual, hypothetical, involving deduction or estimation, etc.) to determine and present relevant any desired information within the results.

What is claimed is:

1. A computer-implemented method of producing search results comprising:
   displaying, in a first window, initial search results based on a query and enabling selection by a user of an item within the search results;
   monitoring actions performed by the user with respect to at least one of the search results from the initial search results and generating information associated with the user's actions, wherein the user's actions are each directed to interaction with the initial search results for a first period of time and include opening at least one of the search results from the initial search results;
   determining a user's interest in the initial search results from the user's actions with respect to the initial search results and associated information;
   determining at least one keyword from the determined user's interest;
   modifying the query with the at least one determined keyword and executing the modified query to produce refined search results;
   automatically displaying each of the plurality of the refined search results in multiple different windows separate from the first window that displays the initial search results;
   monitoring the user's actions with respect to the refined search results, wherein the user's actions with respect to the refined search results are each directed to interaction with the refined search results for a second period of time and include opening at least one of the search results from the refined search results; and
   in response to detecting a change in the user's interest based on the user's actions with respect to the refined search results:
      discarding the user's prior actions with respect to the refined search results; and
      refreshing the refined search results by executing a new query with information based on the user's actions with respect to the refined search results triggering the change in the user's interest to produce new search results for the changed user's interest.

2. The computer-implemented method of claim 1, wherein the associated information comprises an amount of time a user accesses at least one of the opened search results of the initial search results.

3. The computer-implemented method of claim 1, wherein the refined search results are selected from the initial search results.

4. The computer-implemented method of claim 1, wherein the refined search results include items not included within the initial search results.

5. The computer-implemented method of claim 1, wherein the associated information comprises metadata of the at least one opened search result from the initial search results.

6. The computer-implemented method of claim 1, wherein the associated information comprises an identifier of the at least one opened search result from the initial search results.

7. The computer-implemented method of claim 1, wherein the associated information comprises text selected by the user in the at least one opened search result from the initial search results.

8. The computer-implemented method of claim 7, further comprising:
   determining at least one keyword from the text selected by the user;
   supplementing the query with the at least one determined keyword; and
   displaying at least one of the of the refined search results separately from the initial search results.

9. The computer-implemented method of claim 1, wherein the associated information comprises time spent by the user displaying the at least one opened search result from the initial search results.

10. The computer-implemented method of claim 1, wherein the user's actions further comprise selecting text within the at least one opened search result.

11. The computer-implemented method of claim 10, wherein the user's actions further comprise drill-down operations.

12. The computer-implemented method of claim 1, wherein the user's actions further comprise searching for keywords within the displayed initial search results or the at least one opened search result.

13. The computer-implemented method of claim 1, wherein the user's actions further comprise viewing a portion of the at least one opened search results a period of time.

14. The computer-implemented method of claim 1, further comprising data-mining the user's actions for information indicating the relevance of a search result.

\* \* \* \* \*